United States Patent [19]

Protas

[11] Patent Number: 4,476,848
[45] Date of Patent: Oct. 16, 1984

[54] COUNTERTOP OVEN

[76] Inventor: Roger I. Protas, Suite 28F, 10 Waterside Plz., New York, N.Y. 10010

[21] Appl. No.: 435,143

[22] Filed: Oct. 18, 1982

[51] Int. Cl.³ .............................................. A21B 1/00
[52] U.S. Cl. ........................... 126/19 M; 126/273 R; 126/337 R; 126/339; 312/236; 312/311; 312/320; 99/340; 186/38; 219/386; 219/392
[58] Field of Search .............. 126/19 R, 19 M, 337 R, 126/339, 332, 273 R, 275 R, 275 E; 165/DIG. 25, DIG. 26; 312/236, 244, 311, 320, DIG. 33; 99/340; 186/38; 219/386, 390, 392

[56] References Cited

U.S. PATENT DOCUMENTS

| | | | |
|---|---|---|---|
| 1,851,183 | 3/1932 | Hill | 126/337 A |
| 2,588,091 | 3/1952 | Dornbush | 99/340 X |
| 2,633,840 | 4/1953 | Crawford | 126/19 M |
| 2,831,098 | 4/1958 | Lüscher | 312/236 X |
| 3,270,660 | 9/1966 | Filipak | 99/340 |
| 3,848,522 | 11/1974 | Trelc | 99/340 X |

FOREIGN PATENT DOCUMENTS 364334  9/1962  Switzerland .................. 219/392

*Primary Examiner*—Samuel Scott
*Assistant Examiner*—Margaret A. Focarino
*Attorney, Agent, or Firm*—Blum, Kaplan, Friedman, Silberman & Beran

[57] ABSTRACT

A countertop oven particularly well suited for preparing convenience foods, such as frozen dinners and hot sandwiches is provided. The oven includes at least one heating and serving tray with heat resistant handles, the tray sliding into slots in the oven side-walls with the handles on the outside so that the heating and serving tray may be removed from the oven and placed directly on a table for serving. In a preferred embodiment of the invention, the oven includes two pairs of slots for receiving two heating and serving trays and includes three heating elements. This heating configuration permits cooking on the two trays in about sixty percent of the time compared to conventional countertop ovens.

20 Claims, 5 Drawing Figures

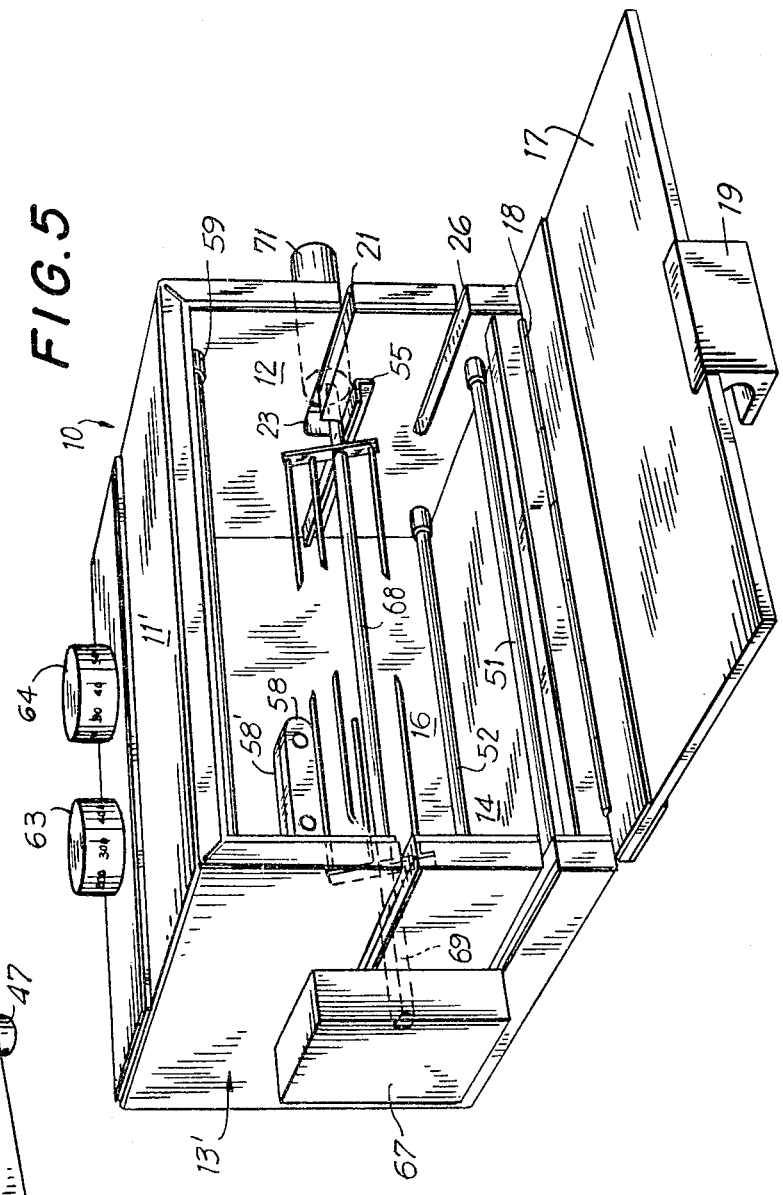
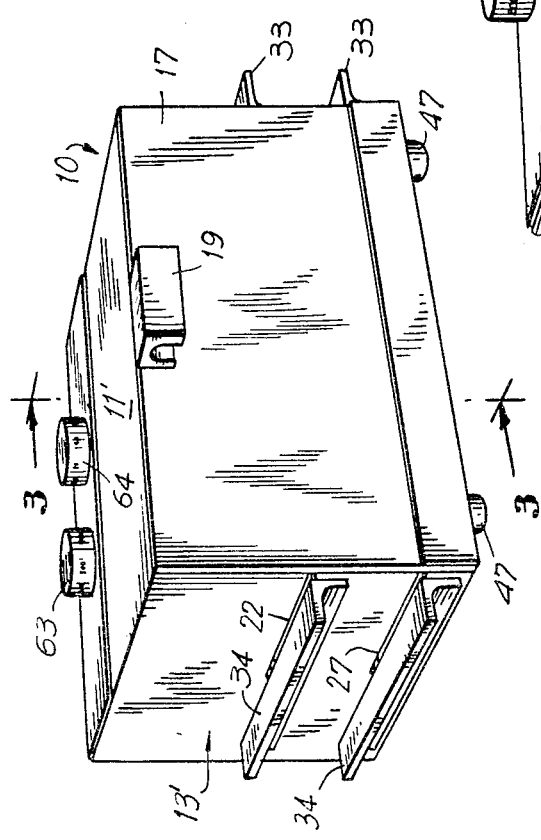

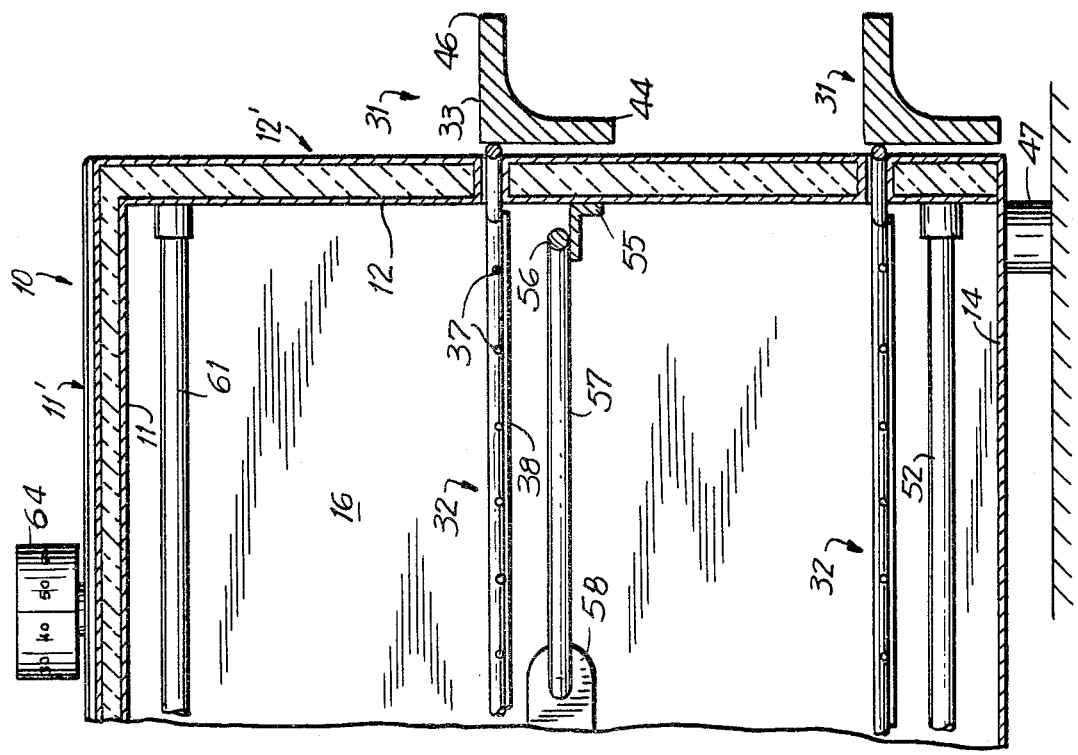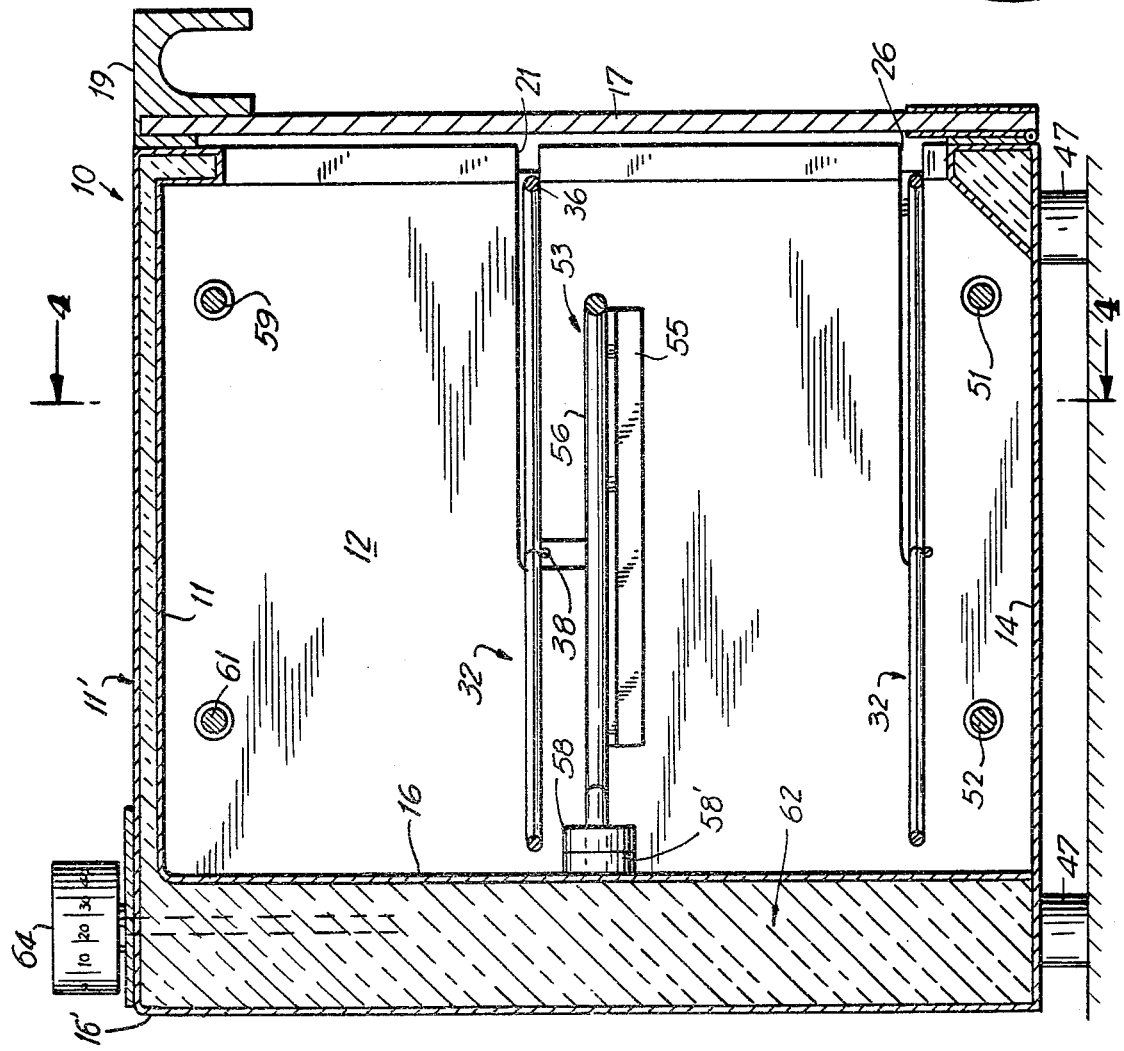

COUNTERTOP OVEN

BACKGROUND OF THE INVENTION

This invention relates generally to an oven, and more particularly to a countertop oven including trays with heat-resistant handles which slide into slots formed in the oven side walls adapted for taking the trays directly from the oven to the table for serving.

There are many small countertop-type ovens available today. These ovens are commonly referred to as toaster ovens and are manufactured by a wide variety of domestic and foreign producers. Most such toaster ovens are substantially similar in size, features and functions. The main differences between the various toaster ovens available concern details of the controls and minor differences in the oven capacity and proportions.

One such popular toaster oven is approximately 14 inches wide, 8½ inches in depth at the base and about 7½ inches in height. The oven has a front door which pivots downward to open exposing the interior wherein a pair of heating coils extend across the front and rear of the top of the oven and two heating coils extend across the middle of the base. A wire frame tray snuggly fits into grooves on the interior walls of the oven for toasting. The wire grill will receive four pieces of conventional bread for toasting at one time. A broiler pan is provided which may be placed on the grill for heating. The oven controls are positioned to the right side of the oven door and permit the user to regulate oven temperature for baking and a toast control.

One manufacturer markets a countertop oven model having two shelves for heating two frozen dinners at one time. The manufacturer's instructions indicate that the food package cooking instructions should be followed. However, in actual tests it was found that this particular two-shelf model did not perform in a completely satisfactory manner as it required about 50 percent more time to cook the dinners than the package instructions.

Most of the toaster ovens available are rated at 1500 watts. They generally have thermostatic controls which permit control of oven temperature. Such conventional thermostatic controls permit the user to set the oven for a desired temperature. This temperature is maintained automatically through cycling action. The electric circuits for maintaining the temperature are housed behind the controls, generally on the side of the oven.

Some larger countertop ovens, generally identified as "broiler ovens" include a rotisserie attachment with a motor positionable on one side of the oven housing and an outside handle on the opposite side of the oven for receiving a spit that slides into a slot and is engaged by the motor at the opposite end for turning the spit.

It would be desirable to provide a countertop oven which operated in a more energy efficient manner than the conventional countertop ovens available and one where the tray utilized for heating the food in the oven could be conveniently removed from the oven without the need for insulated potholders, and placed directly on a table for serving.

SUMMARY OF THE INVENTION

Generally speaking, in accordance with the invention, an improved countertop oven having heating trays with heat-resistant handles adapted to slide into slots formed in the oven side walls for providing a heat seal when in place and for removing the heated trays which can then be placed directly on a table for serving is provided. The oven includes a steel housing for defining an oven cavity and a bottom-hinged glass door on the front panel is provided. The sidewalls of the housing include at least one pair of cooperating slots for receiving heating and serving trays in the oven cavity. The heating and serving trays include a wire grill portion for heating and toasting and have heat-resistant handles which are outside the oven side walls when the tray is positioned in the slots. In a preferred embodiment of the invention, two interchangeable heating and serving trays slide into two pairs of cooperating slots in the side walls of the oven housing. An upper tray slides into slots in the middle of the oven for receiving one frozen dinner and a lower tray slides into slots in the lower portion for receiving the second frozen dinner, or the like. A steel broiler pan may be positioned on either of the heating grids and a crumb tray at the bottom provides for easy clean-up.

The oven includes at least two levels of heater elements and preferably three levels positioned side-to-side: an upper element just below the housing roof, a middle heating element just below the upper slots in the middle of the oven and a lower heating element positioned below the lower slots at the bottom of the oven. The middle heating element may be removable which permits using the oven to cook on the lower heating tray using the full interior dimension of the oven cavity. Additionally, when the middle heating element is removed a rotisserie motor may be mounted on one slot and a spit with a heat-resistant handle positioned in the opposed cooperating slot.

An insulated compartment across the back of the oven housing encloses the oven control unit. The oven control circuits, including an ON/OFF SELECTOR switch, THERMOSTAT CONTROL or TIMER, which can be mechanical or electrical are positioned within the insulated compartment. The oven selector switch selectively operates only the two lower sets of heating elements when toasting bread or when heating only on one tray. When toasting on the lower heating tray, the broiler pan is positioned on the upper tray as a reflector.

Accordingly, it is an object of the invention to provide an improved countertop oven.

It is another object of the invention to provide an improved countertop oven including removable oven-to-table heating and serving trays having heat-resistant handles.

It is a further object of the invention to provide an improved countertop oven more energy efficient than conventional countertop ovens currently available.

Still another object of the invention is to provide an improved combination toaster-oven and broiler oven.

Still a further object of the invention is to provide an improved toaster-oven and broiler oven with three heating elements suitable for cooking on two levels between the heating elements.

Another object of the invention is to provide an improved countertop oven which operates at 1200 watts and cooks two frozen dinners faster than conventional countertop ovens operating at 1500 watts.

Yet another object of the invention is to provide an improved countertop oven having increased cavity capacity occupying approximately the same counter space of such conventional ovens.

Yet a further object of the invention is to provide an improved countertop oven having three heating elements with the middle heating element removable for use as a compact broiler-oven.

A further object of the invention is to provide an improved countertop oven which may be readily adapted for use as a rotisserie.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 2 is a perspective view of the oven of FIG. 1 with two (2) heating and serving trays in the oven and the oven door in a closed position;

FIG. 3 is a cross-sectional view of the oven of FIGS. 1 and 2 taken through line 3—3 of FIG. 2;

FIG. 4 is a cross-sectional view of the oven of FIGS. 1 and 2 taken through line 4—4 of FIG. 3; and FIG. 5 is a perspective view of the oven of FIGS. 1 and 2 with the middle heating element removed and a rotisserie motor and spit installed.

DESCRIPTION OF THE PREFERRED EMBODIMENTS

Figure 1:
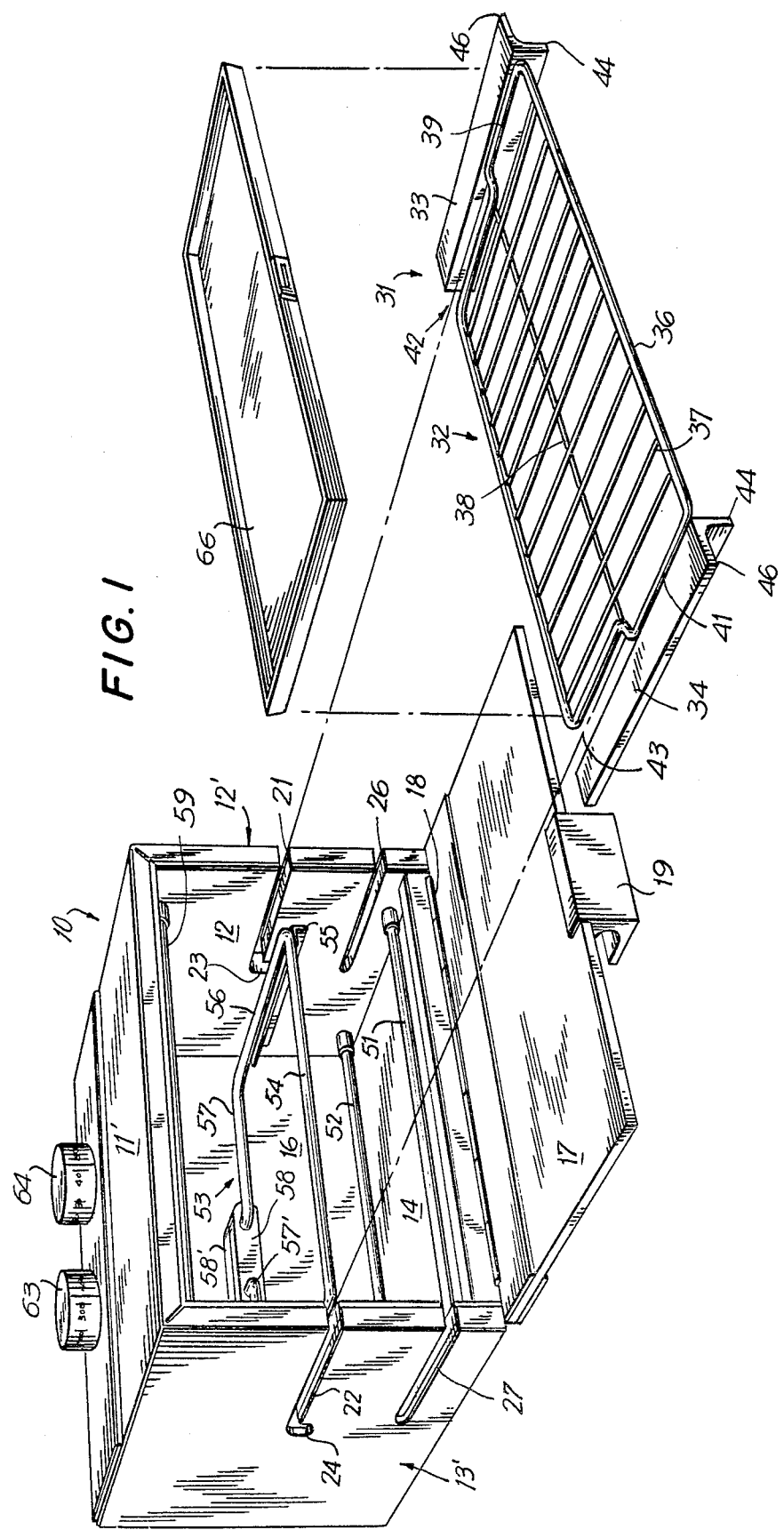
FIG. 1 is a perspective view of a countertop oven constructed and arranged in accordance with the invention with the oven door in an open position and a heating and serving tray for use with the oven.

An oven 10 constructed and arranged in accordance with the invention is shown in a perspective view in FIG. 1. Oven 10 is formed from an inner steel housing which forms a top wall 11, an inner right side wall 12, an inner left side wall 13, a bottom wall 14 and an inner rear wall 16. An outer steel shell forms an outer rear wall 16′, an outer right side wall 12′; an outer left side wall 13′; and an outer top wall 11′. By providing such a double-wall construction, a rear insulated compartment 62 is formed and outer side walls 12′ and 13′ and top 11′ are insulated which is desirable. A door 17 which forms the front of oven 10 is mounted to the front edge of bottom 14 by a hinge 18 so that door 17 pivots downwardly to provide access to the interior of oven 10. A handle 19 is provided at the top of door 17 to facilitate opening door 17.

Right side wall 12 and 12′ are each formed with an upper slot 21 and left side walls 13 and 13′ are each formed with a cooperating upper slot 22. Upper slots 21 and 22 are formed at a position approximately one-half the height of oven 10. Upper slots 21 and 22 are substantially horizontally disposed and extend to a position to the approximate mid point of side walls 12 and 12′ and 13 and 13′, respectively. At this point each slot 21 and 22 is formed with a downwardly facing notch 23 and 24, respectively, for receiving a rotisserie motor and spit which will be described in more detail in connection with the embodiment illustrated in FIG. 5.

Right side walls 12 and 12′ are each also formed with a lower slot 26 and left side walls 13 and 13′ are each formed with a cooperating lower slot 27. Lower slots 26 and 27 extend substantially mid-way back in side walls 12 and 12′ and 13 and 13′. Lower slots 26 and 27 are formed in the lower portion of oven 10 for providing approximately the same distance between lower slots 26 and 27 and upper slots 21 and 22 as the distance between upper slots 21 and 22 and oven top wall 11.

Upper slots 21 and 22 and lower slots 26 and 27 are adapted to receive a heating and serving tray 31 shown in an exploded position from upper slots 21 and 22. Heating and serving tray 31 includes a central metal grill portion 32 and a pair of heat-resistant handles 33 and 34. Metal frame portion 32 is formed with an outer rod 36 which defines the perimeter of grill portion 32 which is substantially rectangular. A series of thin metal rods 37 extend from the front to the rear of grill portion 36 and include a supporting middle rod 38, all of which are securely welded to rod 36. The front region of grill portion 32 is securely fastened at a position 39 to right handle 33 and at a left front position 41 to left handle 34. The rear side portions of grill portion 32 are spaced apart from handles 33 and 34 for forming a space 42 on the right side and a space 43 on the left side.

This configuration of heating and serving tray 31 permits tray 31 to be inserted into upper slots 21 and 22, for example and provide a heat-seal. When tray 31 is inserted into oven 10 handles 33 and 34 are to the outside of outer side walls 12′ and 13′ with front portions 39 and 41 of grill portion 32 resting on the lower edges of slots 21 and 22. Spaces 42 and 43 between grill portion 32 and handles 33 and 34 permit heating and serving tray 31 to be inserted fully into the oven cavity with side walls 12 and 12′ and 13 and 13′ in spaces 42 and 43, respectively.

Handles 33 and 34 are formed of a heat-resistant material, such as phenolic or any other appropriate natural or synthetic material. As handles 33 and 34 are always outside of outer side walls 12′ and 13′, handles 33 and 34 are maintained in a relatively cool condition and may be removed from oven 10 after heating without the need for cumbersome potholders and the like. As countertop ovens are generally of small size, it is often difficult to avoid touching a heated metal surface when reaching to remove cooked food therefrom. Handles 33 and 34 may be shaped as illustrated having a right-angle configuration with a downwardly projecting leg 44 and an outwardly projecting leg 46. By providing handles 33 and 34 with this crosssection, downwardly projecting legs 44 may conveniently be used as legs for placing heating and serving tray 31 directly on a table for serving food after heating on tray 31. A heat insulated mat or trivet is not required as downwardly projecting legs 44 provide a necessary air gap between grid portion 32 and the surface of the table.

In the embodiment of the invention illustrated in FIG. 1, two (2) heating and serving trays 31 are contemplated and are shown installed in oven 10 with door 17 in a closed position in the perspective view of FIG. 2. Oven 10 is supported on four (4) legs 47 shown in FIGS. 2 and 3.

Oven 10 includes three (3) levels of heating elements within the oven cavity. The lower heating element includes a front heating rod 51 and a rear heating rod 52 positioned side-to-side across the bottom of oven 10 just above bottom 14. Heating rods 51 and 52 are mounted between side walls 12 and 13. A middle heating element 53 is removably mounted to rear wall 16 and includes a rectangularly shaped heating loop having a front section 54, opposed side sections 56 and a right rear section 57 and a left rear section 57' which extends to a male ceramic mounting bracket 58 which is coupled to a matching female ceramic receptacle 58' mounted on inner rear wall 16. Receptacle 58' is electrically connected to the heating control circuit of oven 10.

In the preferred embodiment illustrated, middle heating element 53 is supported across the width of oven 10 by a bracket 55 on the interior surface of each side wall 12 and 13. Brackets 55 are positioned below notches 23 and 24 formed at the ends of slots 21 and 22. Accordingly, when heating and serving tray 31 is inserted in slots 21 and 22, middle heating element 23 is just below the elevation of heating and serving tray 31. Middle heating element 53 is removable to permit the full interior volume of oven 10 to be utilized for cooking when heating and serving tray 31 is positioned in lower slots 26 and 27. Additionally, upon removal of middle heating element 53, oven 10 may be used as a rotisserie which will be described in connection with the embodiment illustrated in FIG. 5.

Oven 10 also includes an upper heating element including a front heating rod 59 and a rear heating rod 61 which extends side-to-side across the width of oven 10. Upper heating rods 59 and 61 are mounted to inner side walls 12 and 13 just below the interior surface of top wall 11. Each of the heating elements are formed of standard quartz, calrod or vicor heating elements and connected electrically to the heating control circuit through the insulated portion of the side walls.

It is within the scope of the invention that the middle heating element may be formed from one or two permanently fixed heating rods as lower rods 51 and 52 and upper rods 59 and 61.

Internal temperature within oven 10 may be controlled in one of two ways. First, a conventional thermostatic control circuit positioned in rear insulated compartment 62 behind inner rear wall 16 allows a user to set oven 10 for a desired temperature. Oven 10 is maintained at the selected temperature automatically through cycling action. The temperature to be set is selectively set on a temperature control dial 63 positioned on the rear top of oven 10 directly above insulated compartment 62. Alternatively, the heating elements may be designed to maintain the oven cavity at a pre-set constant temperature of for example 450° to 475° F. In this latter means of temperature control, the food is cooked on a time basis. The time is set selectively by a timer control dial 64 which is positioned at the top rear of oven 10 directly above insulated compartment 62. As the thermostatic control circuit is essentially a conventional circuit its detail will not be described herein. It is noted that the controls are positioned at the rear of oven 10 in the illustrated embodiment in order to provide a more suitable design and permit receipt of handles 33 and 34 to the outside of outer side walls 12' and 13'. It is within the scope of the invention to position the insulated compartment for housing the temperature control circuits in any other position around the oven cavity.

A steel broiling pan 66 sits on either upper or lower tray 31. Broiling pan 66 has a highly reflective surface and is utilized for broiling, for sandwich making and other cooking operations. Additionally, broiling pan 66 is used as a reflector when toasting bread. In this case, bread to be toasted is placed on metal grill 32 of heating and serving tray 31 which is disposed in lower slots 26 and 27 and broiling pan 66 is placed on tray 31 positioned in upper slots 21 and 22.

Oven 10 is dimensioned substantially the same size as conventional countertop ovens. In this respect most are designed to accept a single large size frozen dinner. This size will also generally accommodate four (4) slices of bread placed on metal grill 32.

Middle heating element 53 is removable for cooking large items such as fowl, roasts and casseroles. When middle heating element 53 is removed a rotisserie motor 67 may be mounted on outer left wall 13 at notch 24. A spit 70 including a skewer rod 68 having a square cross-sectional end 69 is engaged by motor 67. The opposite end of rod 68 has a heat-resistant handle 71 mounted thereon positioned to the outer side of outer right wall 12' and rests in notch 23. Notches 23 and 24 at the inner ends of upper slots 21 and 22 keep motor 67 and skewer rod 68 in place by gravity.

Rotisserie motor 67 may be mounted to oven 10 by a mounting bracket with a downwardly extending lip which extends through slot 22 in the oven cavity. This maintains the vertical position of motor 67. Rod 68 engaged by motor 67 at notch 24 maintains the desired front-to-back position of motor 67. Alternatively, a mounting pin may be provided which extends from the housing of motor 67 into outer side wall 13.

Several advantages in energy efficiency are attained by constructing and arranging oven 10 in the manner described. By providing 3 heating elements, food may be cooked at the two levels at the same time. Tests have demonstrated that oven 10 operates more efficiently than conventional countertop ovens. For example, most conventional countertop ovens are rated at 1500 watts. Oven 10 constructed and arranged as described may be rated at 1200 watts, 400 for each of the upper, middle and lower heating elements. In an oven having an interior height dimension of about 8 inches, an interior width of about 12 inches, and an interior depth of about $8\frac{1}{2}$ inches, twice the amount of food may be cooked at 1200 watts in the same time as that of a conventional countertop oven. Of course, the invention is not limited to the dimension of the oven cavity.

When cooking on two heating and serving trays, each holding a TV dinner without foil coverings, an oven constructed and arranged in accordance with the invention will cook the dinners in approximately one-half the time for conventional ovens receiving only one dinner at a time. Since an oven constructed in accordance with the invention uses only eighty percent of the wattage of the conventional oven and cooks in approximately one-half the time, it is believed that oven 10 cooks with less power consumption per unit of food. Additional tests have also shown that TV dinners cooked with foil coverings will cook in approximately seventy-five percent of the time for conventional countertop ovens. Again, as the oven uses only eighty percent of the wattage of the conventional oven cooking in seventy-five percent of the time, it is believed that the oven utilizes less power per unit of food than that utilized by the conventional ovens employing a cycling action.

In addition to the energy saving features just described, oven 10 provides additional benefits. Although oven 10 can handle twice the food capacity of conventional countertop ovens, it takes up approximately the same amount of countertop space as the conventional countertop ovens. While it is somewhat higher than the conventional oven height it is less of a problem than the "footprint" on a kitchen counter, where space is usually at a premium.

The removable heating and serving trays may be designed to be decorative as well as functional. In this respect, they can be taken directly from oven 10 to the table without the need for potholders to carry the tray and without the need for a placemat. The tray is sufficiently decorative to function as its own table setting so that a user may eat the cooked food directly from the tray. Tests have also shown that oven 10 takes somewhat longer to toast bread than the average conventional toaster-oven. However, the many advantages outlined above are deemed to far outweigh this slight disadvantage.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An oven comprising:
    a steel oven housing including a top wall and an opposed bottom wall, two opposed side walls between the top and bottom walls and a rear wall joined to the top, bottom and side walls for defining an oven cavity;
    a door openably mounted to the front of said housing for providing access to the oven cavity;
    each of the opposed side walls formed with at least one cooperating slot from the front of the oven housing extending towards the rear of the oven;
    heating means for providing heat to the oven cavity; and
    a heating and serving tray formed with heat-resistant handles, said tray adapted to slide into the cooperating slots in the oven side walls with the handles remaining on the exterior of the oven housing to facilitate removal of the heated tray and food thereon after heating and wherein the heating and serving tray is a substantially rectangular grill and formed with a metal rod about the perimeter, the metal rod mounted to the heat-resistant handles in the front region and the rear sides of the rod spaced apart from the heat-resistant handles whereby when said tray is inserted into the slots, the side wall is positioned between the rod in the rear section of the tray and the heat-resistant handle.

2. The oven of claim 1, wherein the oven side walls are each formed with two slots for receiving two heating and serving trays, one of said pair of cooperating slots formed at about the mid-height of the oven cavity and the second of said cooperating slots formed in the bottom portion of the side walls near the bottom wall of the oven.

3. The oven of claim 2, wherein said heating means includes first upper heating means disposed in the region near the top of the oven cavity, middle heating means disposed in the region below the upper pair of cooperating slots and lower heating means disposed below the lower pair of cooperating slots and above the oven bottom, said upper, middle and lower heating means including a heating element for heating the interior of the oven cavity.

4. The oven of claim 3, wherein the middle heating means is removable.

5. The oven of claim 3, wherein each of upper, middle and lower heating means includes at least one elongated heating element running side-to-side and permanently mounted to the opposed side walls.

6. The oven of claim 5, wherein each of upper, middle and lower heating means includes two elongated heating elements running side-to-side and permanently mounted to the opposed side walls.

7. The oven of claim 4, wherein the upper and lower heating means includes two elongated heating elements running side to side and the middle heating means is a heating element in a loop.

8. The oven of claim 4, wherein the upper pair of cooperating slots includes a downwardly projecting notch for receiving a rotisserie motor on one side wall and for receiving a spit engageable by the motor at one end and having at the opposed end a heat-resistant handle extending to the outside of the opposite side wall.

9. The oven of claim 1, wherein the oven door is pivotably mounted at the bottom of the steel housing.

10. The oven of claim 1, wherein the heat-resistant handles are formed with downwardly projecting means so that the heating and serving tray and food heated thereon may be removed from the oven in a heated condition and placed directly on a table for serving with a space between the surface of the table and the heated portion of the tray.

11. The oven of claim 1, wherein the steel housing forms an inner oven housing, the oven further including an outer top wall, two outer sidewalls and an outer rear wall, each cooperating with the respective walls of the inner housing for providing an insulated top, side walls and rear wall.

12. The oven of claim 1, wherein the oven further includes an insulated circuit compartment for housing the circuit for controlling the oven heating means positioned at the rear of the oven housing.

13. The oven of claim 12, further including controls for regulating the oven disposed at the top of the insulated compartment.

14. The oven of claim 1, wherein the heating means heats continuously for maintaining the oven cavity at a pre-selected constant temperature range.

15. The oven of claim 1, wherein the heating means includes thermostat means for maintaining the oven cavity at a selected temperature through cycling action.

16. A countertop oven comprising:
    an inner steel oven housing including a top wall and an opposed bottom wall, two opposed side walls between the top and bottom walls and a rear wall joined to the top, bottom and side walls for defining an oven cavity;
    an outer steel housing including a top wall, two opposed side walls and a rear wall for cooperating with the inner steel housing and spaced apart therefrom for providing an insulated compartment in the back of the oven between the cooperating rear walls and for providing the oven with an insulated top and side walls;
    an oven door openably mounted to the front of oven for selectively providing access to the oven cavity;
    each of the opposed inner and outer side walls formed with two slots from the front of the oven housing extending approximately mid-way to the rear of the oven, the upper slots formed in about the midpoint in height of the side walls and including a downwardly projecting notch and the second lower slots formed in the lower portion of the oven walls spaced apart from the bottom wall;

three levels of heating elements in the oven cavity, a first upper heating element disposed in the region near the top of the oven cavity, a middle heating element disposed in the region below the upper pair of cooperating slots and a lower heating element disposed below the lower pair of cooperating slots and above the oven bottom;

a heating and serving tray formed with heat-resistant handles in each pair of cooperating slots, said trays adapted to slide into the cooperating slots in the oven side walls with the handles remaining on the exterior of the outer oven housing to facilitate removal of the heated trays and food thereon after heating; and heating control circuit means for controlling the oven heating elements positioned in the insulated circuit compartment between the rear walls of the oven.

17. The countertop oven of claim 16, wherein the middle heating element is a heating element loop selectively removable from the oven and the inner side walls include beneath the downwardly facing notch of the slot a bracket for supporting said heating loop.

18. The countertop oven of claim 17, further including a rotisserie motor mounted on one side wall at the downwardly facing notch of the slot and a spit mounted in the downwardly facing notch of the cooperating slot on the opposite side wall.

19. The countertop oven of claim 16, wherein each of upper middle and lower heating elements includes two elongated heating rods disposed side-to-side and permanently mounted to the opposed side walls.

20. A countertop oven comprising:
a steel oven housing including a top wall and an opposed bottom wall, two opposed side walls between the top and bottom walls and a rear wall joined to the top, bottom and side walls for defining an oven cavity;

an oven door openably mounted to the front of oven for selectively providing access to the oven cavity;

each of the opposed side walls formed with one cooperating slot from the front of the oven housing extending approximately midway to the rear of the oven;

two levels of heating elements in the oven cavity, a first upper heating element disposed in the region near the top of the oven cavity, and a lower heating element disposed below the pair of cooperating slots and above the oven bottom;

a heating and serving tray formed with heat-resistant handles said tray adapted to slide into cooperating slots in the oven side walls with the handles remaining on the exterior of the oven housing to facilitate removal of the heated tray and food thereon after heating and wherein the heating and serving tray is a substantially rectangular grill and formed with a metal rod about the perimeter, the metal rod mounted to the heat-resistant handles in the front region and the rear sides of the rod spaced apart from the heat-resistant handles whereby when said tray is inserted into the slots, the side wall is positioned between the rod in the rear section of the tray and the heat-resistant handle; and heating control circuit means for controlling the oven heating elements.

* * * * *